United States Patent [19]

Garotta

[11] 4,403,313
[45] Sep. 6, 1983

[54] PROCESS AND AN APPARATUS FOR SEISMIC GEOPHYSICS WITH PROCESSING BY FOCUSES

[75] Inventor: Robert J. Garotta, Chatenay Malabry, France

[73] Assignee: Compagnie Generale de Geophysique, Massy, France

[21] Appl. No.: 217,248

[22] Filed: Dec. 17, 1980

[30] Foreign Application Priority Data

Dec. 17, 1979 [FR] France .................. 79 30851

[51] Int. Cl.$^3$ .............................. G01V 1/36
[52] U.S. Cl. ........................ 367/61; 367/40
[58] Field of Search .............. 367/53, 50, 61, 54, 367/56, 63, 59, 43, 40

[56] References Cited

U.S. PATENT DOCUMENTS

| | | | |
|---|---|---|---|
| 3,472,334 | 10/1969 | Snodgrass | 367/61 |
| 3,571,788 | 3/1971 | Backus et al. | 367/40 |
| 3,940,734 | 2/1976 | Blum | 367/50 |
| 4,346,462 | 8/1982 | Baullay | 367/61 |

FOREIGN PATENT DOCUMENTS 2066467 7/1981 United Kingdom .................. 367/40

Primary Examiner—Nelson Moskowitz
Attorney, Agent, or Firm—Schwartz, Jeffery, Schwaab, Mack, Blumenthal & Koch

[57] ABSTRACT

The invention relates to seismic prospecting of the sub-surface.

At least two adjacent focuses F and F', at least one reflecting interface H and directions such as ($D_1$) and ($D_2$) are selected in the sub-surface. A seismic trace, from which a portion containing the effect due to the reflecting interval is extracted, is made to correspond to each direction and to each focus. The correlation function between the two trace portions relative to two adjacent focuses and the same direction is then determined. The correlation functions obtained are finally summed for the different directions.

Application to high resolution seismic prospecting.

30 Claims, 14 Drawing Figures

FIG_1

FIG_2a

FIG_2b

FIG_2c

FIG_3

FIG_4

FIG_5

FIG_7c

FIG_7d

FIG_8a

FIG_8b

PROCESS AND AN APPARATUS FOR SEISMIC GEOPHYSICS WITH PROCESSING BY FOCUSES

BACKGROUND OF THE INVENTION

The present invention relates to the seismic prospecting of the sub-surface.

With this technique, a number of seismic sensors as well as one or more sources of artificial seismic shocks are arranged on the soil. In simple versions, the sensors and sources are situated in the same vertical plane. They can be considered as approximately aligned if the unevenness of the terrain is disregarded as the effects thereof can be corrected later on. The seismic sensors and sources are usually also distributed regularly, often at the same intervals.

The various seismic sources are excited successively on the terrain. Each time a source is excited, the various seismic signals or "traces" received by each of the sensors owing to the acoustic waves produced by the shock are recorded selectively. Each trace therefore corresponds to a source-sensor pair.

In so-called "reflection" seismics, one is interested in the reflections of acoustic waves from "reflection points" in the sub-surface. For this purpose, it is known to combine all the traces for which the source and the sensor are symmetrical about a given vertical, for example by adding all these traces. The reflections appearing in the resultant trace indicate the reflection points. Suitable graphic representation of the resultant traces associated with the various verticals permits geophysicists to understand better the structure of the sub-surface. This process of so-called "multiple coverage" reflection seismics therefore seeks reflection points corresponding to the same depth in the various traces received.

Reflection seismics with multiple coverage will give valuable information about the sub-surface. However, "deaf zones" sometimes appear and result in uncertainties about the interpretation of the profile of certain strata. More generally, although reflection seismics defines the strongly reflecting interfaces fairly well, it does not permit the features in the intervals between interfaces of the sub-surface (velocity and absorbtion in particular) to be analysed in detail.

SUMMARY OF THE INVENTION

The present invention aims specifically to fill these gaps.

The process proposed starts from the same basic stages as those of the prior art. Some seismic sensors are arranged on the soil with sources of artificial seismic shocks, the sensors and sources being situated in approximately the same vertical plane. The seismic sources are excited one by one, while the seismic signals or "traces" received as a function of the time by the various sensors and related to the acoustic waves induced in the sub-surface by each of the shocks are recorded selectively each time. Static and dynamic correction of these traces is then effected to allow for the fact that sensors and sources are not arranged strictly in the same horizontal. If there are i sources and j sensors, there are thus i sets of j traces which are therefore designated individually by $s_{ij}$.

Implementation of the process according to the invention also presupposes the availability of preliminary information on the sub-surface, in particular on the reflecting strata thereof. This information can originate from geological research and/or geophysical probes of all sorts, for example electrical probes. Conventional reflection seismic processing by multiple coverage, as defined above, is preferably carried out beforehand starting from the recorded and corrected traces. In other words, this processing involves a combination (most simply, addition) of traces having a common reflection point.

The process according to the invention may comprise the following subsequent operations, starting from the above-mentioned i sets of j traces $s_{ij}$:

(a) selecting at least two adjacent points known as focuses, at least one reflecting interface and a predetermined direction in the sub-surface;

(b) selecting for each focus a seismic trace which corresponds to a propagation path passing through this focus and orientated in the predetermined direction, taking the reflection at the interface into consideration;

(c) extracting from each trace selected in this way a portion of trace containing the effect due to the reflecting interface;

(d) quantitatively comparing the two portions of trace obtained for the two focuses to each other;

(e) repeating operations a to d, changing the predetermined direction each time; and (f) averaging the results of comparisons made for paths of waves orientated in different directions, thereby permitting assessment of any differences between the two focuses with regard to their seismic properties.

In a preferred embodiment, the two portions of traces in operation c are defined from the same time gate. Operation d involves determining the correlation function between the two portions of traces, and operation f involves summing the correlation functions obtained for the various wave path directions.

One of skill in the art knows that the seismic properties of the sub-surface can be represented by various parameters. Two of these parameters are advantageous for carrying out the invention: time and energy. Thus, it is advantageous to consider at least one of the following parameters at the peak of the sum of the correlation functions: delay of a peak with regard to the time origin or peak amplitude (in relation to the reflected energy).

The difference between the peak delays relative to two pairs of two adjacent focuses having a common focus is related to the difference in the propagation rates of the waves at these points, whereas the difference in the peak amplitudes is related to the variation in absorption of the waves existing when passing from one pair of focuses to the next.

A standard correction is preferably made on the sources and sensors in the region of the initial seismic traces and, during operation d, the variations in the reflecting capacity of the interface are taken into consideration when passing from one focus to another. This is important, in particular, if the amplitude of the traces is of interest.

In a particular embodiment, the propagation paths are defined by simple equations. In this case, $e_i$ designates the abscissae of the various sources, $r_j$ those of the various sensors, p the common interval between sources and between sensors, and h the depth of the reflecting interface which is assumed to be horizontal, while $x_o$ and $y_o$ are the co-ordinates of a focus. Operation b involves the search for traces associated with a source ($e_i$)-sensor ($r_j$) pair such that:

$$2h\, x_o = y_o \cdot r_j + (2h - y_o)e_i$$

The orientation of each trace is given by the value $$\frac{x_o - e_i}{y_o} = \cot \alpha$$

and the above equations are substantially satisfied with an accuracy of p/2. A dip correction taking into consideration the inclination of the reflecting interface to the horizontal is allowed for if necessary.

Up until now, only a single reflecting interface, which is preferably a strongly reflecting stratum deeper than the focuses, has been considered. In reality, such a situation arises fairly frequently, but it is also very common for the sub-surface to comprise several moderately reflecting interfaces, some of which are above the focuses. The invention also applies to this situation.

In this case, several reflecting interfaces (all those existing or only a proportion thereof) are selected during operation a. In operation b, one trace is selected for each focus, each propagation path orientation and each reflecting interface. And the comparison operation d involves the various pairs of traces which are related respectively with the two focuses while corresponding to the same orientation and the same reflecting interface.

This process therefore involves comparison of two similar trace portions not only for each orientation of the wave path, but also for each of the reflecting interfaces retained. In practice, it is often more advantageous to group the portions of traces relating to various reflections and to the same orientation so that operation c thus makes use of trace portions constituting a continuous sequence of reflection effects. This operation c thus also involves the synthesis of a composite seismic trace connected with each focus and each propagation path orientation starting from portions extracted from the various traces relative to the various reflecting interfaces.

In a particular embodiment of the process with multiple interfaces, the traces of all sensors $r_j$, with j varying from 1 to n, are explored during operation b for each source $e_i$ and subject to a correction for dip. From each trace, there is taken about a time $t_{ij}$ a section defined by a time gate $f_i$, with $t_{ij}$ defined by $$y_o(r_j - e_i) = (x_o - e_i) \cdot 2 \cdot V \cdot t_{ij} \cdot \sin \alpha$$

wherein V represents the average propagation velocity in the sub-surface whereas $x_o$ and $y_o$ are the co-ordinates of a focus, and with $f_i$ defined by $$f_i = p \frac{y_o}{x_o - e_i} \cdot \frac{1}{2V \sin \alpha}$$

wherein p is the common interval between sources and between sensors. Where all the sections of traces which are temporally adjacent to each other are combined for each focus and each orientation $$\frac{x_o - e_i}{y_o} = \cot \alpha$$

In the process with multiple interfaces, the evauation operations preferably take place in the following manner:

the comparison operation d involves determining an upstream correlation function between the similar trace portions corresponding to the same orientation, to two focuses and to times prior to the arrival of the waves at each focus, and determining a downstream correlation function between the similar trace portions corresponding to the same orientation, to the two focuses and to times subsequent to the arrival of the waves at each focus and operation f involves determining for each focus, on the one hand, a first upstream summation which involves the upstream correlation functions for the various orientations and, on the other hand, a second downstream summation which involves the downstream correlation functions for the various orientations.

If necessary, a correction is made, taking into consideration the effect of the disharmony between the interfaces situated above the focuses and those situated below.

Fundamentally, the process according to the invention proposes a comparison of the seismic properties of two adjacent or focus points known as such because they are related to a collection of traces which are related to seismic wave paths which meet them in various directions. However, the process proposed is particularly useful when considering a fairly high number of focuses (for example, 100) distributed along a line or in a region of the sub-surface to be examined, preferably at an interval equal to the common interval p between the sources and between the sensors. In the case of a line of focuses, the line can be defined by a geological level to be examined, in particular reflecting interface, where the velocity and absorption of the seismic waves are sought. If the line of focuses coincides with a reflecting interface, the invention permits an energy balance to be made along this interface since the absorbed energy is equal to the incident energy reduced by the transmitted energy and the reflected energy.

On the other hand, focuses which are suitably distributed in a region of the sub-surface corresponding to a deaf zone in conventional seismic reflection permit this deaf zone to be examined more fully. More generally, the process according to the invention provides a much better resolution than the processes of the prior art.

The invention also relates to the analogical or digital apparatus intended for carrying out the operations characteristic of the invention.

BRIEF DESCRIPTION OF THE DRAWINGS

Other characteristics and advantages of the invention will appear on reading the following detailed description given with reference to the attached drawings in which.

DETAILED DESCRIPTION OF THE INVENTION

Figure 1:
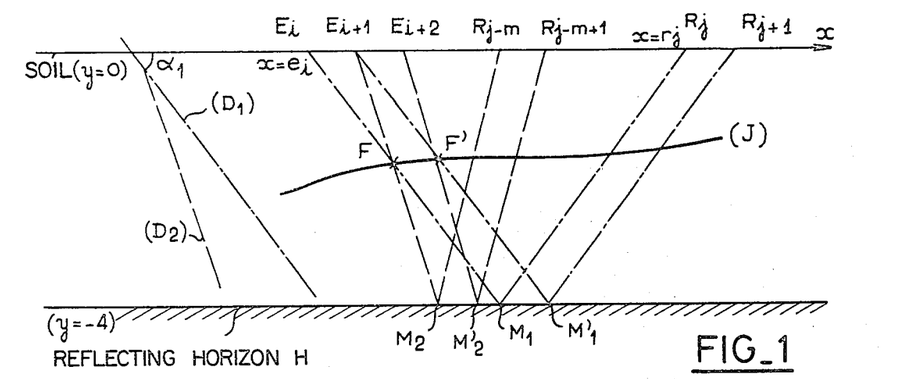
FIG. 1 shows a first embodiment of the process according to the invention when considering only a single deep reflecting interface in the sub-surface.

FIG. 1 shows a sub-surface comprising a single or "horizon" reflecting interface H which is horizontal and is situated at a depth h. The abscissae of the sources $E_i$ and sensors $R_j$ are designated $e_i$ and $r_j$ on the horizontal soil defining the zero ordinate. The distance between sources is the same as between the sensors and is designated p. If a shock is created in the region of the source $E_i$ the sensor $R_j$ receives the seismic trace $s_{ij}$. In a known manner, the traces form the subject of static and dynamic correction operations so that a horizontal soil with a zero ordinate can be obtained by disregarding the unevenness of the terrain.

The invention considers paths of seismic waves passing in various directions through focuses such as F. (Although the seismic waves propagate over a volume, it is usual to allocate a propagation axis or path to them).

A wave path between $E_i$ and $R_j$, after reflection at the reflecting point M of depth h, can be quantified by a parameter a which varies from zero to one between $E_i$ and $R_j$. If x and y are the co-ordinates of a point on the path $E_i$ M $R_j$, then:

$$a = \frac{y}{2h} \text{ between } E_i \text{ and } M \quad (I)$$

or $$a = 1 - \frac{y}{2h} \text{ between } M \text{ and } R_j \quad (II)$$

and $$x = a\, r_j + (1 - a)\, e_i \quad (III)$$

According to the invention, a focus F with co-ordinates $x_o$ and $y_o$ (unit 12, FIGS. 4 and 5) and a reflecting horizontal at depth h (unit 11) as well as a direction (which will change, in a plurality of possible values) are selected. The condition for the focus F to be situated on the portion $E_i$M of a wave path is obtained by eliminating a from equations (I) and (III), and is written:

$$2h\cdot x_o = y_o\cdot r_j + (2h - y_o)e_i \quad (IV)$$

and the direction or orientation of this wave path is represented by the value $$\frac{x_o - e_i}{y_o} = \cot \alpha \quad (V)$$

As an alternative, each focus can be placed on a portion such as $MR_j$ of the wave path and the condition will thus be written:

$$2h\cdot x_o = y_o\cdot e_i + (2h - y_o)r_j \quad (VI)$$

The direction is defined by the inclination of $MR_j$, or by reference to the angle $\alpha$ in equation (V).

It is thus feasible to make a source sensor pair $E_i$-$R_j$ and a trace $s_{ij}$ (unit of calculation 14 which determines, for example, addresses in the recording 15 of all seismic traces) correspond to a focus, a reflecting horizon and a predetermined direction. According to FIG. 4, the unit 10 defines a parameter of direction which it will be able to increment on command and which is transmitted to the calculation unit 14. According to the equations given above, the calculation unit 14 can thus select a particular trace at 15 by making, if necessary, an approximation between the direction selected at 10 and that given by equation (V) above.

More generally, by scanning all the traces $s_{ij}$, a subset of traces corresponding to paths passing through the focus F in different directions and reflecting on the horizon H will be found. In each of the traces, reflection due to a reflection point such as M will be seen.

Figure 5:
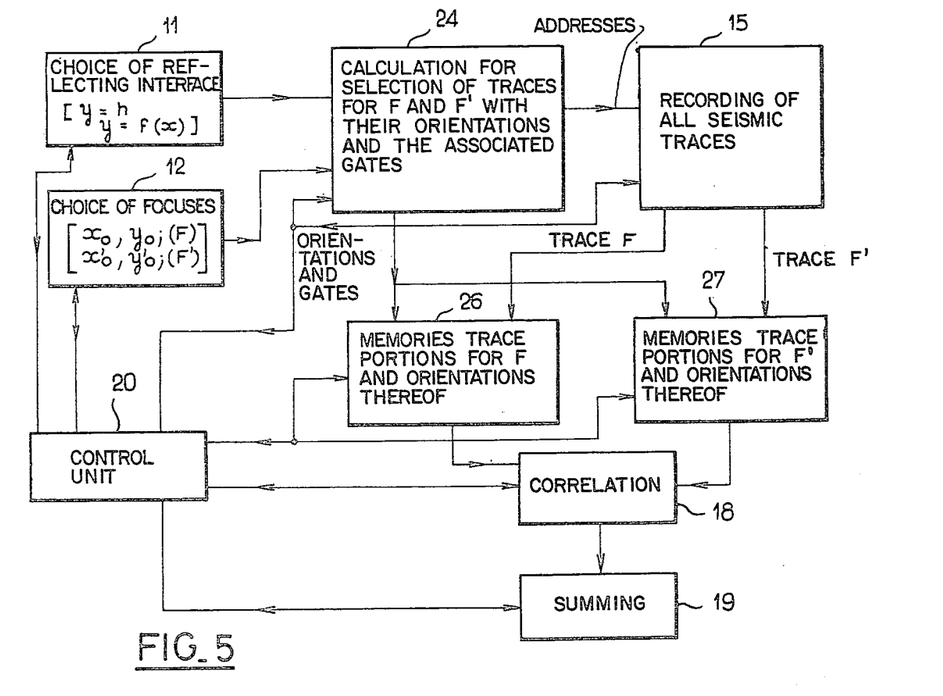

FIG. 5 illustrates a variation on this type of system. Starting from a choice of focus 12 and of interface 11 the unit 24 calculates the addresses of this sub-assembly of traces at 15 as well as the associated orientations.

Figure 4:
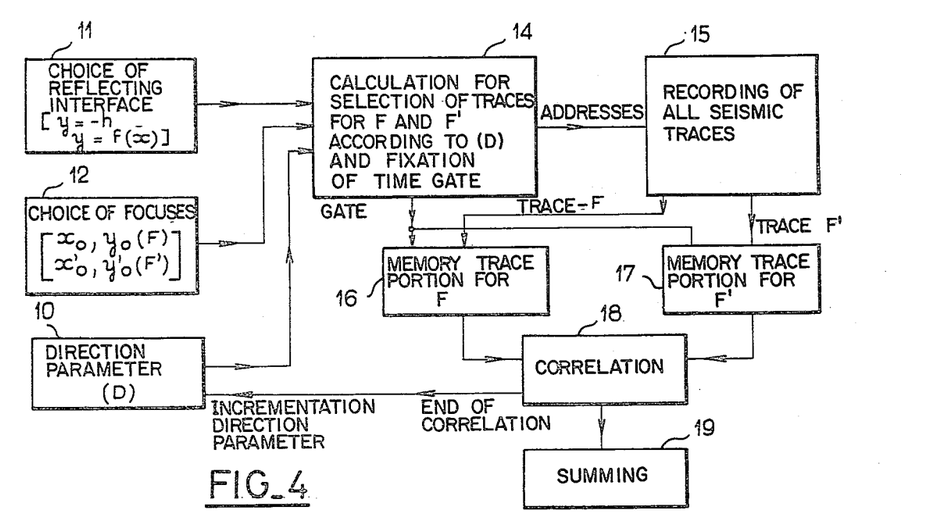
FIGS. 4 and 5 show two examples of the apparatus which can be used for carrying out the process according to the invention, in the form of functional diagrams.

In practice, the reflecting horizon is frequently not rectilinear. Each time that its slope to the horizontal exceeds a pre-established threshold, it is preferable to make a correction of dip using the unit 14 or 24 which causes trigonometric functions of the inclination $\theta$ of the horizon at the reflection point M or approximations of these trigonometric functions to intervene in the equations given above by means of their series expansion since the perpendicular to the horizon at point M remains the bisector of the angle $E_i$ M $R_j$.

The invention thus causes the intervention of a series of focuses placed, for example, along a line J. Two focuses F and F' are illustrated in FIG. 1. As with the first one, another source-sensor pair (units 14 or 24) is made to correspond to the second focus F', to the horizon H and to the predetermined direction (D), taking into consideration the equations given above, for example, the pair $E_{i+1}$, $R_{j+1}$, with which the trace $s_{i+1, j+1}$ is associated.

Figure 2A:
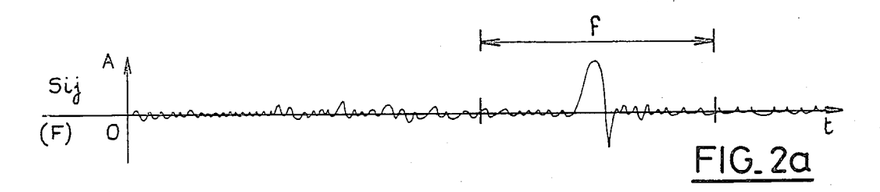
FIGS. 2a and 2b show how two portions of traces inside a gate f are extracted from two traces passing through two adjacent focuses F and F' and corresponding to the same wave propagation orientation.
Figure 2B:
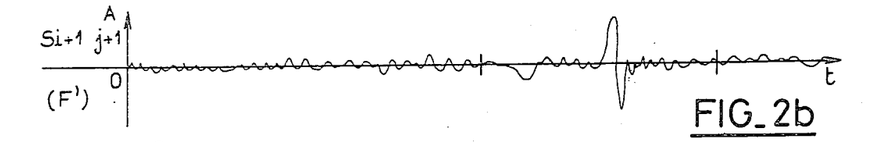

As shown in FIGS. 2a and 2b, portions of the two selected traces $s_{ij}$ and $s_{i+1, j+1}$ are extracted during a time gate f whose time is selected in advance with regard to its starting point and duration (sample memories 16 and 17).

Figure 2C:
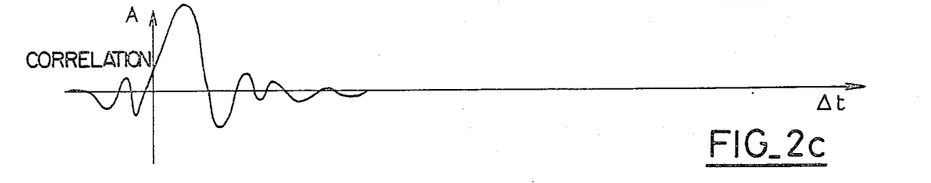
FIG. 2c shows the correlation between two trace portions extracted in accordance with FIGS. 2a and 2b.

Next, the two trace portions obtained are compared to each other, advantageously by determining the correlation function between these portions (unit 18). The shape of such a function is illustrated in FIG. 2c.

The same operations are then repeated for the various focuses such as F and F' with the same reflecting horizon H and a different direction ($D_2$) instead of ($D_1$). For this purpose, the end of the correlation at 18 increments the direction parameter given by the unit 10. The selection thus gives other source-sensor pairs:

$$E_{i+1} - M_2 - R_{j-1} \text{ and}$$

$$E_{i+2} - M'_2 - R_{j-m+1}$$

for example, hence the traces $s_{i+1, j-1}$ as well as $s_{i+2, j-m+1}$. Two portions corresponding to the same time gate are also extracted from these traces. A time gate which is particular to each direction (connection between the unit 14 and the memories 16 and 17) can be made to correspond, or a general time gate which is sufficiently large to include the reflection whatever the orientation can be selected. And the correlation function between these two trace portions is determined here again.

These operations are renewed for further orientations. As far as possible, all the orientations available are utilised for each focus by means of the traces $s_{ij}$. A new correlation function is obtained each time.

Figure 3:
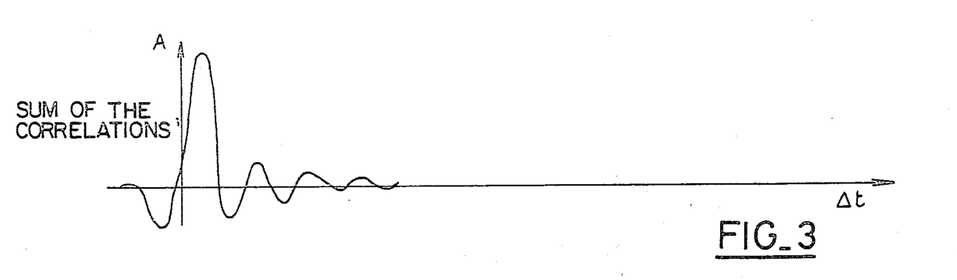
FIG. 3 shows the sum of correlation functions obtained for the various wave propagation orientations.

Finally, the unit 19 (FIGS. 4 and 5) sums the correlation functions obtained for the various wave path directions (FIG. 3).

Each of the individual correlation functions comprises a peak which can be defined by its time and its amplitude. Similarly, the sum of the correlation functions will comprise a peak associated with a time and an amplitude.

The applicants have observed that the time interval between the peak of the sum of the correlation functions and the time origin is representative of the travel time variation of the waves when passing from F to F'. If this variation is positive, the terrain is "slower" in the vicinity of the focus F' than the terrain in the vicinity of the focus F, slowness referring to the propagation of seismic waves in this case. Conversely, if the variation is negative, the terrain at F' is faster than at F.

The amplitude of the peak of the sum of correlation functions is related to the energy carried by the seismic waves passing in the different paths taken into consideration. That is to say, it can be considered as representative of the average energy passing through the two focuses concerned, F and F' in this case.

The peak amplitude of the sum of the correlations can thus be allocated to a point situated between the focuses F and F', for example in their midpoint. Repetition of this operation over a large number of focuses permits the relative energy curve to be constructed step by step along the line (J) of the focuses (FIG. 1). With a sufficiently fine sampling interval, information about the distribution of seismic energy along the line J is thus obtained without the need to evaluate the energy passing at each of the focuses F and F'.

For this purpose, it is preferable to make a standard correction to the sources and the sensors so as to take into consideration their individual responses. It is advantageous also to take into consideration the variations in the reflecting capacity of the reflecting interface H as known, for example on the basis of conventional preliminary processing, in multiple coverage reflection seismics.

Moreover, it will be observed that the distribution of seismic energy along the line of the focuses (J) is related to the variation in absorption of seismic waves occuring along this line (J).

It has been stated in the foregoing that two focuses, a reflecting interface and a predetermined direction are chosen in order to select two traces, to extract two respective portions from them, to construct the correlation thereof and to recommence by changing the predetermined direction.

Of course, it may be advantageous in practice to group the operations differently and, for example, giving oneself the focuses and the reflecting interface:

To seek all the traces corresponding to a passage through each focus with reflection at the interface by associating an orientation or direction to each one (unit 24, FIG. 5);

to extract from each trace a useful portion containing the "reflection" with the aid of a gate which may or may not depend on the orientation (sample memories 26 and 27 with a memory positioning for each orientation);

to construct for each orientation the correlation (18) of two trace portions relating to two adjacent focuses (step by step if there are more than two focuses selected);

to build (19) the sume of the correlation function associated with two adjacent focuses for each of the orientations (and for all the focuses initially selected).

In this case, the operations are advantageously coordinated by a control unit 20 which may be incorporated into the calculation unit 24. The elements 15 to 19 as well as 26 and 27 can be analogical (magnetic tape memories, for example). They will preferably be digital like the magnetic recordings made on the terrain, and all the processing can thus be effected in a computer.

Up until now, a single interface has been considered in the sub-surface, beneath the line or region of the focuses. Such a situation may in fact be encountered, at least in the form of a deep interface whose reflecting properties greatly surpass those of other superjacent interfaces. However, it is frequent to find several comparable reflecting interfaces, some of which are situated beneath the focuses and some above. The method in which the invention can be generalised to cover these cases will now be described.

Figure 6:
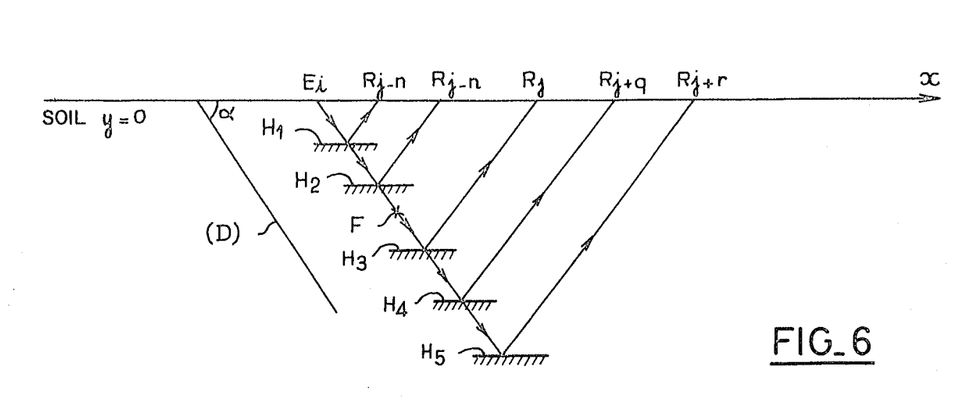
FIG. 6 shows the basis of a second embodiment of the process according to the invention when considering several reflecting interfaces in the sub-surface.

Overall, all or some of the existing reflecting interfaces are taken into consideration. All the source-sensor pairs corresponding to paths passing through the focus in the selected direction, with reflections at the various interfaces, and not only a single source-sensor pair will be made to correspond to each focus and each direction. FIG. 6 shows this in the case of a single focus F to simplify the drawing. Five reflecting interfaces which are all horizontal are shown. Owing to their parallelism, there will be a common source $E_i$ for the various possible reflections, whereas the sensor changes with the reflecting interface ($R_{j-m}$, $R_{j-n}$, $R_{j+q}$, $R_{j+r}$).

Each of the source-sensor pairs thus defined corresponds to the same focus, the same direction and to one of the reflecting interfaces. As above, the focus can alternatively be placed on the rising portion common to the wave paths reflected by different reflection horizons.

It is thus possible, as above, to determine the correlation function of two trace portions corresponding to two adjacent focuses for the same wave propagation direction and the reflections thereof at the same interface, then to sum the various correlation functions obtained when the propagation direction is changed. This results in a correlation sum for each pair of adjacent focuses and each interface. And the sum of correlations allocated to each interface, as described above with reagard to a single interface, can be interpreted.

Thus, by comparing, for each pair of focuses, the data obtained at the level of the various interfaces it becomes possible to follow, as a function of the depth (successive interfaces):

The evolution of the variations in propagation velocity between the two focuses;

the evolution of the average energy passing in the vicinity of the pair of focuses.

The distinction between what happens upstream of the focuses (interfaces situated above them) and what happens downstream of the focuses (interfaces deeper than them) is particularly interesting.

For this purpose, the invention recommends a very advantageous mode of operation in which the reflection effects encountered at the different interfaces are considered in a continuous succession. A composite seismic trace which groups sequentially the various reflection effects, respecting their temporal situation and the time continuity, is preferably synthesized for this purpose, starting from trace portions corresponding to the different interfaces (same focus, same propagation direction).

In a simple particular embodiment, the following mode of operation is adopted, (see FIG. 6):

(a) As above, at least two focuses (such as F) a propagation direction (D) and, this time, several interfaces are selected;

(b) a seismic trace $s_{ij}$ (corresponding to a source $E_i$—sensor $R_j$ pair, allowing for a dip in the reflecting horizons if necessary) is associated with each focus, with the direction and with each interface;

(c) in each trace, there is taken about a time $t_{ij}$ a portion defined by a time gate $f_1$, with $t_{ij}$ defined by $$y_o(r_j - e_i) = (x_o - e_i) 2 \cdot V \cdot t_{ij} \cdot \sin\alpha \qquad (VII)$$

Figure 7A:
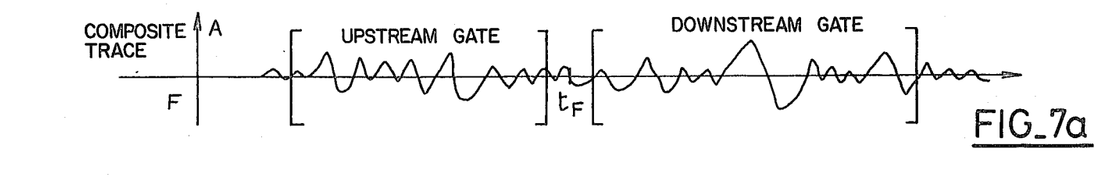
FIGS. 7a and 7b show two examples of composite traces obtained by associating various portions of traces relating to the same wave propagation orientation and to reflections on various interfaces.

$x_o$ and $y_o$ are the co-ordinates of focus and V represents the average propagation rate in the sub-surface (or the rate of the vicinity of the focus concerned, if it is known otherwise), whereas $f_i$ is defined by $$f_i = p \cdot \frac{y_o}{x_o - e_i} \cdot \frac{1}{2V \sin\alpha} \qquad (VIII)$$

wherein p represents the interval which is assumed to be common between the sources and between the sensors; after which, all these trace portions can be combined in composite trace associated with the selected focus and orientation, since they are temporally adjacent to each other (FIG. 7a)

Figure 7B:
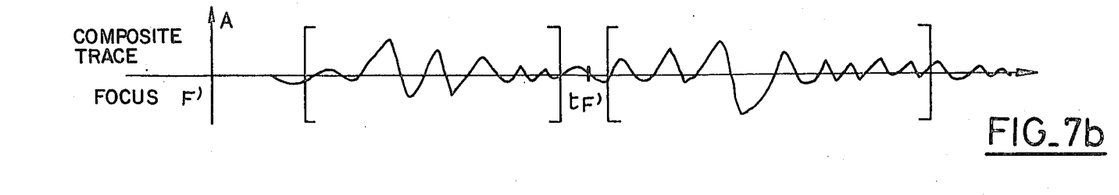
Figure 7C:
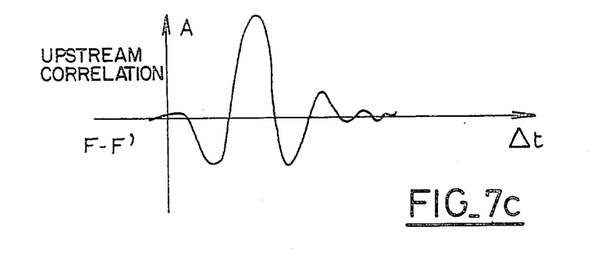
FIGS. 7c and 7d show how an upstream correlation function and a downstream correlation function are determined by means of seismic traces of the type illustrated in FIGS. 7a and 7b.
Figure 7D:
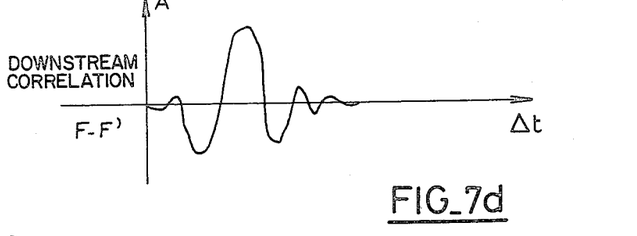

The distinction between what happends upstream and downstream of the focuses can thus be made very simply, the process taking place as follows, with the aid of another composite trace (FIG. 7b) relating to a focus F' next to the first one;

(d) An upstream correlation function (FIG. 7c) between the composite trace portions of two adjacent focuses (same propagation direction) situated in an upstream gate is determined for times smaller than $y_o/V$ as well as a downstream correlation function (FIG. 7d) between the same composite trace portions which are situated in a downstream gate for times greater than $y_o/V$. The upper limit of the downstream gate can be defined according to the deepest reflecting stratum.

(e) as in the case of a single reflecting interface, the process is recommenced for different propagation directions passing through the two adjacent focuses.

(f) the upstream correlation functions (FIG. 8a) and the downstream correlation functions (FIG. 8b) obtained for the different propagation directions of the waves passing through the two adjacent focuses are summed separately.

Figure 8A:
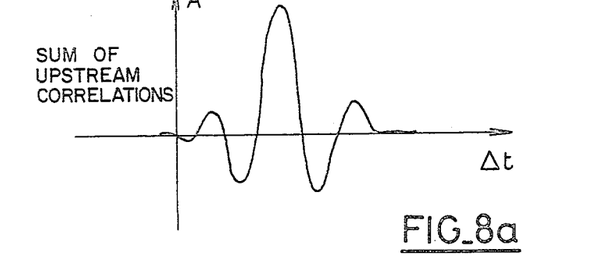
FIGS. 8a and 8b illustrate the form of the sums of the upstream correlation functions as well as the downstream correlation functions by way of example.
Figure 8B:
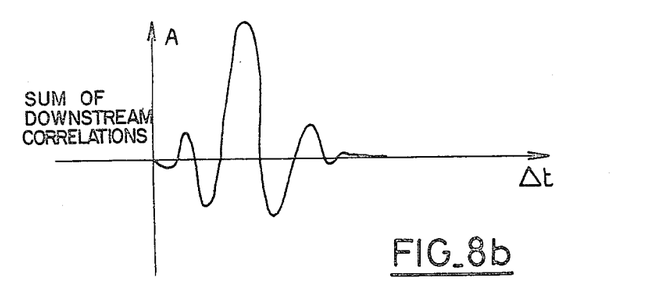

The distance between the peaks of the correlation sums reflects the variation in the travel time passing through the focus F or the focus F'. In the case of non-concordant tectonics, there may be a disparity between the distribution of the reflecting interfaces situated above the focuses and the distribution of the interfaces situated below. This disparity is measured over a conventional seismic section with multiple coverage for example. It is easy to determine from it the effect on the correlations and, by a time correction, to cut out this effect of the temporal interval between the correlation peaks.

Moreover, as in the case of a single reflecting interface, the amplitude of the peaks of the correlation sums permits the evolution of the energy absorbed when passing from F to F' to be appreciated.

To this end, the ratio between the peak amplitude of the upstream correlation sum and the peak amplitude of the downstream correlation sum is preferably determined for each pair of focuses. Observation of the evolution of this ratio along the line of the focuses, (or inside the region covered by the focuses) gives access to the evolution of the absorbed energy.

The invention applies more particularly if the line of focuses coincides approximately with a reflecting interface: the sum of the upstream correlations corresponds to the incident energy. The sum of the downstream correlations corresponds to the transmitted energy. For its part, the reflected energy can be determined by taking the traces corresponding to paths having a common reflection point situated in the vicinity of the focus (seismic processing of the conventional multiple coverage type). And an energy balance can thus be made along the line of focuses since the absorbed energy is equal to the incident energy reduced by the transmitted and reflected energies.

The invention thus permits analysis of the sub-surface with high resolution in the region of the selected focuses. As the skilled artisan knows, this analysis can obviously be refined by proceeding by successive approximations, the process being repeated, each time with increasing precision in the parameters determined during proceding stages:

more precise corrections in the dip, the disharmony or the reflecting capacity of the interfaces;

more precise definition of the wave propagation velocity or consideration of non-rectilinear propagations due to refraction effects, for example.

The invention is applied in all fields where geophysical exploration is useful and particularly in the following case: "Enhanced recovery" is frequently desired in reservoirs (oil for example) by injecting water therein; the invention permits the evolution of a fluid during such operations to be followed accurately.

For this purpose, the values finally issuing from the process according to the invention will form the subject of a suitable graphical representation along the line of the focuses or inside the region of the focuses.

I claim:

1. A method for seismic prospecting of a subsurface, comprising the steps of:

(a) arranging seismic shock sources and seismic sensors on a surface along a predetermined array situated approximately in a single vertical plane;

(b) energizing the seismic sources one by one, while selectively recording the seismic trace received by each sensor subsequent to the energization of each seismic source, each seismic trace thus being associated to a respective source-sensor pair;

(c) performing static and dynamic corrections of the seismic traces to accommodate any variation in the arrangement of the sensors and sources from said vertical plane;

(d) determining at least one reflecting interface in the subsurface;

(e) selecting, in the subsurface, at least two adjacent focuses and a predetermined direction, said two focuses being situated between the surface and said reflecting interface;

(f) for each focus:
- (f1) selecting a source-sensor pair which corresponds to a propagation path having a forward section starting from the source to a reflection at a reflecting interface and a return section starting from the reflecting interface to the sensor, as least one section of said propagation path having substantially said predetermined direction;
- (f2) selecting a seismic trace corresponding to said source-sensor pair;
- (f3) extracting from said selected seismic trace a trace portion comprising a reflection signal due to the reflecting interface;

(g) determining a correlation function between trace portions corresponding to said at least two focuses;

(h) repeating steps (e) to (g) while changing the predetermined direction for each repetition; and (i) determining the average of the correlation functions obtained for each of the predetermined directions, thereby assessing any differences in seismic properties of the subsurface in respective areas of said at least two focuses.

2. The method according to claim 1, wherein the trace portions of step (g) are defined from a single time gate, and the step of determining the average of the correlation functions comprises summing the correlation functions obtained for the various directions to produce summation correlations.

3. The method according to claim 1, wherein said summation correlations have respective peaks and further comprising the step of;
determining a time delay of the peaks of the summation correlation functions with regard to a time origin, the difference between the peak delays associated with two pairs of two adjacent focuses having a common focus being related to the difference in the wave propagation velocities in the respective areas of said two pairs of focuses.

4. The method according to claim 2, further comprising the step of;
determining the amplitude of the peak of the sum of the correlation functions, the difference between the peak amplitudes associated with two pairs of two adjacent focuses having a common focus being related to the difference in the absorption of the waves in the respective areas of said two pairs of focuses.

5. The method according to claim 1, wherein the step of performing corrections further comprises performing a standard correction of the seismic traces based upon individual source and sensor responses.

6. The method according to claim 1, wherein the step of determining a correlation function includes accounting for variations in reflecting capacity of said interfaces between respective reflecting points in said propagation paths.

7. The method according to claim 1, wherein determining at least one reflective interface comprises performing a preliminary common depth point processing of seismic traces.

8. The method according to claim 1, wherein the step of selecting at least two adjacent focuses comprises selecting a plurality of focuses distributed along a line of the subsurface, and wherein steps (e) to (i) are further repeated for selected pairs of adjacent focuses.

9. The method according to claim 1, wherein the step of determining at least one reflecting interface further comprises determining a plurality of reflecting interfaces in the subsurface; and
steps (e) to (i) are further repeated for each of the reflecting interfaces.

10. The method according to one of claims 1 to 9, wherein $e_i$ represents the abscissae of said sources, and $r_j$ that of said sensors, p, a common interval between sources and between sensors and, h, a depth of the reflecting interface which is assumed to be horizontal, and wherein $x_o$ and $y_o$ represent coordinates of a focus, and wherein a source ($e_i$)-sensor ($r_j$) pair is selected whereby:

$$2h\, x_o = y_o \cdot r_j + (2h - y_o)e_i$$

and each trace has a direction whereby $$\frac{x_o - e_i}{y_o} = \cot \alpha$$

where $\alpha$ is the angle between the surface and said propagation path and the above equation being satisfied approximately with an accuracy of p/2, if necessary allowing for a dip correction taking into consideration the inclination of the reflecting interface to the horizontal.

11. A method for seismic prospecting of a subsurface, comprising the steps of:

(a) arranging seismic shock sources and seismic sensors on a surface along a predetermined array situated approximately in a single vertical plane;

(b) energizing the seismic sources one by one, while selectively recording the seismic trace received by each sensor subsequent to the energization of each seismic source, each seismic trace thus being associated to a respective source-sensor pair;

(c) performing static and dynamic corrections of the seismic traces to accommodate any variation in the arrangement of the sensors and sources from said vertical plane;

(d) determining a plurality of reflecting interfaces in the subsurface;

(e) selecting, in the sub-surface, at least two adjacent focuses and a predetermined direction, said two focuses being situated between the surface and at least the deepest of said reflecting interfaces;

(f) for each focus and each reflecting interface:
- (f1) selecting a source-sensor pair which corresponds to a propagation path having a forward section starting from the source to a reflection at a reflecting interface and a return section from the reflecting interface to the sensor, at least one section of said propagation path having substantially said predetermined direction;
- (f2) selecting the seismic trace corresponding to said source-sensor pair;
- (f3) extracting from said selected seismic trace a trace portion comprising a reflection signal due to the reflecting interface;

(g) for each focus, synthesizing a composite seismic trace comprising in sequence trace portions corresponding to the various reflecting interfaces and to said predetermined direction;

(h) determining a correlation function between the composite seismic traces corresponding to said at least two focuses;

(i) repeating steps (e) to (h) while changing the predetermined direction for each repetition; and (j) determining the average of the correlation functions obtained for each of the predetermined directions, thereby assessing any differences in seismic properties of the subsurface in respective areas of said at least two focuses.

12. The method according to claim 11, wherein at least one of the reflecting interfaces is above said at least two focuses, and the step of determining a correlation function further comprises separately determining an upstream correlation function corresponding to a time interval in said composite seismic traces prior to arrival of the waves at said focuses, and a downstream correlation function corresponding to a time interval in said composite seismic traces after the arrival of the waves at said focuses, and the step of determining the average of the correlation functions further comprises separately determining the average of the upstream and downstream correlation functions, respectively, for each predetermined direction.

13. The method according to claim 12, further comprising performing a correction taking into consideration the effect of any disparity between interfaces situated above the focuses and those situated below the focuses.

14. The method according to claim 11, wherein two trace portions are defined from a single time gate, and wherein in the step of determining the average of the correlation functions further comprises summing the correlation functions obtained for the various directions to produce summation correlations.

15. The method according to claim 14, further comprising the step of;
determining a time delay associated with the occurrence of peaks of the summation correlation functions with regard to a time origin, the difference between delays associated with two pairs of two adjacent focuses having a common focus being related to the difference in the wave propagation velocities in the respective areas of said two pairs of focuses.

16. The method according to claim 14, further comprising the step of;
determining the amplitude of a peak of the sum of the correlation functions, the difference between peak amplitudes associated with two pairs of two adjacent focuses having a common focus being related to the difference in the absorption of the waves in the respective area of said two pairs of focuses.

17. The method according to claim 11, wherein the step of performing corrections further comprises performing a standard correction of the seismic traces based upon individual source and sensor responses.

18. The method according to claim 11, wherein the step of determining said correlation function comprises accounting for variations in reflecting capacity of each interface between respective reflecting points in said propagation paths.

19. The method according to claim 11, wherein said plurality of reflecting interfaces are determined by performing a preliminary common depth point processing of seismic traces.

20. The method according to claim 11, wherein the step of determining reflecting interfaces further comprises selecting a plurality of focuses distributed along a line of the sursurface, and repeating steps (e) to (j) for selected pairs of adjacent focuses.

21. The method according to one of claims 11 to 20, wherein $e_i$ represents the abscissae of the various sources, $r_j$ that of the sensors, p, a common interval between sources and between sensors and, h, a depth of a reflecting interface which is assumed to be horizontal, and wherein $x_o$ and $y_o$ represent coordinates of a focus, and wherein the source-sensor of step (f1) is selected whereby:

$$2h\, x_o = y_o \cdot r_j + (2h - y_o)\, e_i$$

where $e_i$ represents the abscissa of a source and $r_j$ the abscissa of a sensor and each trace has a direction whereby:

$$\frac{x_o - e_i}{y_o} = \cot \alpha$$

where $\alpha$ is the angle between the surface and said propagation path, the above equation being satisfied approximately with an accuracy of p/2, if necessary allowing for a dip correction taking into consideration the inclination of the reflecting interface to the horizontal.

22. A method for seismic prospecting of a subsurface, comprising the steps of:
(a) arranging seismic shock sources and seismic sensors on a surface along a predetermined array situated approximately in a single vertical plane;

(b) energizing the seismic sources one by one, while selectively recording the seismic trace received by each sensor subsequent to the energization of each seismic source, each seismic trace thus being associated to a respective source-sensor pair;

(c) performing static and dynamic corrections of the seismic traces to accommodate any variation in the arrangement of the sensors and sources from said vertical plane;

(d) determining a plurality of reflecting interfaces in the subsurface, and at least one average propagation rate of seismic energy in the subsurface;

(e) selecting, in the subsurface, at least two adjacent focuses and a predetermined direction, said two focuses being situated between the surface and at least the deepest of said reflecting interfaces;

(f) for each focus having coordinates $x_o$, $y_o$, and each source having an abscissa $e_i$, and each sensor having an abscissa $r_j$, wherein the source and sensors are spaced by a common interval p:

(f1) scanning traces ($s_{ij}$) corresponding to the source where j varies from 1 to n, each trace $s_{ij}$ being associated with a respective orientation parameter given by the relationship $$\frac{x_o - e_i}{y_o} = \cot \alpha$$

(f2) extracting from each trace a trace portion defined by a time gate $f_i$ about a time $t_{ij}$, where $t_{ij}$ is defined by $$y_o(r_j = e_i) = (x_o - e_i) \cdot 2 \cdot V \cdot t_{ij} \sin\alpha$$

and where $f_i$ is defined by $$f_i = p \frac{y_o}{x_o - e_i} \cdot \frac{1}{2V \sin\alpha}$$

subject to a dip correction accounting for any inclination from the horizontal of a reflecting interface associated with said time gate,
(g) for each focus, synthesizing a composite seismic trace comprising in sequence all trace portions generally associated with each value of said orientation parameter;
(h) determining a correlation function between the composite seismic traces corresponding to said at least two focuses;
(i) repeating steps (g) and (h) while changing the value of the orientation parameter for each repetition; and
(j) determining the average of correlation functions obtained for each of the various orientations, thereby assessing any differences in seismic properties of the subsurface in respective areas of said at least two focuses.

23. The method according to claim 22, wherein at least one of the reflecting interfaces is above said at least two focuses, and the step of determining a correlation function further comprises separately determining an upstream correlation function corresponding to a time interval in said composite seismic traces prior to arrival of the waves at said focuses, and a downstream correlation function corresponding to a time interval in said composite seismic traces after the arrival of the waves at said focuses, and the step of determining the average of the correlation function further comprises separately determining the average of the upstream and downstream correlation functions, respectively, for each orientation parameter.

24. The method according to claim 23, further comprising performing a correction taking into the consideration the effect of any disparity between interfaces situated above the focuses and those situated below the focuses.

25. The method according to claim 22, further comprising the step of;
determining a time delay associated with the occurrence of peaks of the summation correlation functions with regard to a time origin, the difference between delays associated with two pairs of two adjacent focuses having a common focus being related to the difference in the wave propagation velocities in the respective areas of said two pairs of focuses.

26. The method according to claim 22, further comprising the step of;
determining the amplitude of a peak of the sum of the correlation functions, the difference between peak amplitudes associated with two pairs of two adjacent focuses having a common focus being related to the difference in the absorption of the waves in the respective areas of said two pairs of focuses.

27. The method according to claim 22, wherein the step of performing corrections further comprises performing a standard correction of the seismic traces based upon individual source and sensor responses.

28. The method according to claim 22, wherein the step of performing said correlation function comprises accounting for variations in reflecting capacity of each interface between respective reflecting points in said propagation paths.

29. The method according to claim 22, wherein said plurality of reflecting interfaces are determined by performing a preliminary common depth point processing of seismic traces.

30. The method according to claim 22, wherein the step of determining reflecting interfaces comprises selecting a plurality of focuses distributed along a line of the subsurface, and repeating steps (e) to (j) for selected pairs of adjacent focuses.

* * * * *